(12) United States Patent
Liu et al.

(10) Patent No.: US 12,536,422 B2
(45) Date of Patent: Jan. 27, 2026

(54) PHOTOVOLTAIC CELL PARAMETER IDENTIFICATION METHOD BASED ON IMPROVED EQUILIBRIUM OPTIMIZER ALGORITHM

(71) Applicant: Guizhou Power Grid Company Limited, Guiyang (CN)

(72) Inventors: Bin Liu, Guiyang (CN); Zhukui Tan, Guiyang (CN); Saiqiu Tang, Guiyang (CN); Changbao Xu, Guiyang (CN); Houpeng Hu, Guiyang (CN); Chao Ding, Guiyang (CN); Chenghui Lin, Guiyang (CN); Jiaxiang Ou, Guiyang (CN); Jipu Gao, Guiyang (CN); Yutao Xu, Guiyang (CN); Yu Wang, Guiyang (CN); Li Zhang, Guiyang (CN); Mingyong Xin, Guiyang (CN); Xiaobing Xiao, Guiyang (CN)

(73) Assignee: Guizhou Power Grid Company Limited, Guiyang (CN)

( * ) Notice: Subject to any disclaimer, the term of this patent is extended or adjusted under 35 U.S.C. 154(b) by 895 days.

(21) Appl. No.: 17/786,556

(22) PCT Filed: Dec. 31, 2020

(86) PCT No.: PCT/CN2020/141889
§ 371 (c)(1),
(2) Date: Jun. 17, 2022

(87) PCT Pub. No.: WO2022/095265
PCT Pub. Date: May 12, 2022

(65) Prior Publication Data
US 2023/0035108 A1   Feb. 2, 2023

(30) Foreign Application Priority Data
Nov. 9, 2020 (CN) .......................... 202011239017.4

(51) Int. Cl.
*G06N 3/063* (2023.01)
*H02S 50/00* (2014.01)

(52) U.S. Cl.
CPC ............. *G06N 3/063* (2013.01); *H02S 50/00* (2013.01)

(58) Field of Classification Search
CPC ................................ G06N 3/063; H02S 50/00
(Continued)

(56) References Cited

U.S. PATENT DOCUMENTS

2005/0083129 A1* 4/2005 Tsurumaki .............. H03F 1/301
330/285
2012/0249047 A1  10/2012 Kelly et al.
(Continued)

FOREIGN PATENT DOCUMENTS

CN       106779065 A  *  5/2017  ............. G06N 3/084
CN       106780130 A  *  5/2017  ........ G06Q 10/06393
(Continued)

OTHER PUBLICATIONS

International Search Report and Written Opinion of the corresponding PCT application No. PCT/CN2020/141889 mailed on Aug. 10, 2021.

*Primary Examiner* — Justin C Mikowski
(74) *Attorney, Agent, or Firm* — IDEA Intellectual Limited; Sam T. Yip

(57) ABSTRACT

The invention discloses a method of photovoltaic cell parameter identification based on the improved equilibrium optimizer algorithm, which comprises: step 1, establishing PV cell model and fitness function; step 2, based on the measured output I-V data, predicting output data of PV cell by a BP neural network; step 3, identifying PV cell parameters by using IEO algorithm until convergence conditions of the IEO algorithm are reached, and finally outputting the
(Continued)

optimal identified parameters. Solving technical problems of the existing technology such as, cannot reach the optimal parameter identification, and being easy to be trapped into the local optimal.

10 Claims, 6 Drawing Sheets

(58) Field of Classification Search
USPC .......................................................... 703/2
See application file for complete search history.

(56) References Cited

U.S. PATENT DOCUMENTS

| | | | | |
|---|---|---|---|---|
| 2015/0331972 | A1* | 11/2015 | McClure | G06F 17/11 |
| | | | | 703/2 |
| 2016/0233682 | A1* | 8/2016 | Do Rosario | H02J 3/003 |
| 2019/0172159 | A1* | 6/2019 | Sun | G06Q 30/018 |

FOREIGN PATENT DOCUMENTS

| | | | | |
|---|---|---|---|---|
| CN | 109992911 A | | 7/2019 | |
| CN | 110518819 A | * | 11/2019 | ............ H02M 7/48 |

* cited by examiner

PHOTOVOLTAIC CELL PARAMETER IDENTIFICATION METHOD BASED ON IMPROVED EQUILIBRIUM OPTIMIZER ALGORITHM

FIELD OF THE INVENTION

The invention belongs to the technical field of photovoltaic cells, in particular to a photovoltaic (PV) cell parameter identification method based on an improved equilibrium optimizer algorithm.

BACKGROUND OF THE INVENTION

Nowadays, serious environmental deterioration, such as deforestation and air pollution, and the rapid depletion of non-renewable resources such as traditional fossil fuels, are threatening the sustainable development of the world. In order to deal with the increasingly severe environmental problems, the long-term energy revolution and energy structure transformation has become inevitable. Among them, solar energy is regarded as one of the most promising and effective alternative energy sources, which has been widely used due to its convenient installation, abundant reserves, and pollution-free emissions. Accurate identification of electrical parameters related to PV cell models is the most important and critical step among PV system performance analysis, fault diagnosis and Maximum Power Point Tracking (MPPT). There are mainly two parameter identification methods in the prior art, namely, analysis method and deterministic method. The analysis method relies mainly on some key points on the I-V curve provided by the manufacturer, based on which a series of mathematical calculations are performed to identify the parameters of the model. This method is simple in structure, but not accurate enough in changing operating environment. Deterministic methods mainly use the convexity of P-V characteristic curve of PV system to identify parameters, which can have relatively more accurate identification results. However, this method is extremely strict on model characteristics and sensitive to initial conditions and gradient information, which make them easy to be trapped into local optimum. Therefore, how to identify the parameters of PV cell model accurately and quickly under the condition of limited measurement data has become the focus and difficulty of current research.

SUMMARY OF THE INVENTION

The technical problem to be solved by the invention: for solving the technical problems such as the existing technology cannot achieve the optimal parameter identification and is easy to be trapped into the local optimal, a photovoltaic cell parameter identification method based on the improved equilibrium optimizer algorithm is provided.

The technical scheme of the invention is as follows:

A photovoltaic (PV) cell parameter identification method based on an improved equilibrium optimizer (IEO) algorithm, comprising: step 1, establishing a PV cell model and a fitness function; step 2, based on a measured output I-V data, predicting an output data of a PV cell by a Back Propagation (BP) neural network; step 3, identifying parameters of the PV cell by using the IEO algorithm until convergence condition of the IEO algorithm is reached, and finally outputting optimal identified parameters.

Method of the step 1's establishing the PV cell model and the fitness function comprises: adopting a dual diodes PV cell model and establishing an output current-voltage characteristic equation as below:

$$I_L = I_{ph} - I_{sd1}\left[\exp\left(\frac{q(V_L + I_L R_s)}{a_1 V_T}\right) - 1\right] - I_{sd2}\left[\exp\left(\frac{q(V_L + I_L R_s)}{a_2 V_T}\right) - 1\right] - \frac{V_L + I_L R_s}{R_{sh}}$$

Where $I_L$ and $V_L$ respectively indicate an output current and an output voltage of the PV cell; $I_{sh}$ indicates a current flowed through a parallel resistance $R_{sh}$; and the heat voltage $V_T$ is defined as:

$$V_T = \frac{KT}{q}$$

Where T indicates a cell temperature; $K=1.38\times10^{-23}$ J/K indicates Boltzmann constant; $q=1.6\times10^{-19}$ C indicates electron charge; $I_{ph}$ is photogenerated current, $I_{sd1}$ and $I_{sd2}$ are reverse saturation current of the diode, $R_s$ is the series resistance, $R_{sh}$ is the parallel resistance, and diode ideal factors $a_1$ and $a_2$ are the parameters to be identified;

Selecting root mean square error (RMSE) as an objective function, and, for achieving an optimal effect, the minimum objective function is required, such that an equation of the objective function is established as below:

$$RMSE(x) = \sqrt{\frac{1}{N}\sum_{k=1}^{N}(f(V_L, I_L, x))^2}$$

Where RMSE (x) is the objective function; $x=\{I_{ph}, I_{sd1}, I_{sd2}, R_s, R_{sh}, a_1, a_2\}$ indicates a solution vector including unknown parameters to be identified; RMSE indicates the root mean square error; N indicates a number of experiments; $f(V_L, I_L, x)$ is an error function which is represented as below:

$$f(V_L, I_L, x) = I_{ph} - I_{sd1}\left[\exp\left(\frac{q(V_L + I_L R_s)}{a_1 V_T}\right) - 1\right] - I_{sd2}\left[\exp\left(\frac{q(V_L + I_L R_s)}{a_2 V_T}\right) - 1\right] - \frac{V_L + I_L R_s}{R_{sh}} - I_L$$

Where the fitness function is designed as an extension function of RMSE, represented as an equation below:

$$F(x) = \sqrt{\frac{1}{N+N_p}\sum_{k=1}^{N+N_p}(f(V_L, I_L, x))^2}$$

Where Np indicates the number of predicting data.

Method of the step 2's, based on the measured output I-V data, predicting an output data of the PV cell by the neural network comprises: a main structure of the BP neural network is the same as a main structure of ordinary neural network, consisting of three parts: input layer, hidden layer and output layer; a basic process including forward propagation and back propagation; weights and biases are updated successfully based on the back propagation from the output layer to the input layer; and repeating the foregoing processes until a final iteration criterion is met.

Method of predicting the output data of the PV cell by the BP neural network further comprises: in the forward propagation, for $j^{th}$ neuron in $i^{th}$ layer, an input $z_j^I$ is described as:

$$z_j^l = \left(\sum_1^n \omega_{ij}^l \alpha_i^{l-1}\right) + b_j^l$$

Where n indicates the number of the neurons of $(l-1)^{th}$ layer; $\omega_{ij}^l$ indicates a weight of $i^{th}$ neuron of $(l-1)^{th}$ layer pointing to $j^{th}$ neuron of $(l-1)^{th}$ layer; $b_j^l$ indicates a bias of $j^{th}$ neuron of $l^{th}$ layer; $a_i^{l-1}$ indicates value of $z_j^l$ calculated based on sigmoid function $$F(z) = \frac{1}{1+e^{-z}},$$

represented as:

$$\alpha_i^l = F(z_j^l);$$

In the back propagation, an error $L^m$ of a single sample is defined as:

$$L^m = L(\hat{y}^m - y^m)$$

Where L is loss function, $\hat{y}^m$ is output value of a positive sample propagation; $y^m$ is sample value; according to a chain rule, for a single sample m, a partial derivative of a weight $\nabla \omega_{jk}^{l+1}$ from the $j^{th}$ neuron of the hidden layer to $k^{th}$ neuron of the output layer is:

$$\nabla \omega_{jk}^{l+1} = L'(\hat{y}^m) \cdot F'(z_k^{l+1}) \cdot \alpha_i^l$$

And a partial derivative of a bias bf is calculated by the equation below:

$$\nabla b_j^{l+1} = L'(\hat{y}^m) \cdot F'(z_k^{l+1})$$

By defining learning rate as μ, a weight matrix and a bias matrix are updated as below:

$$\omega^l = \omega^l - \mu \nabla \omega^l$$

$$b^l = b^l - \mu \nabla b^l$$

Where $\omega^l$ and $\nabla \omega^l$ respectively indicate a weight matrix from $(l-1)^{th}$ hidden layer to $l^{th}$ hidden layer and a bias of the weight matrix $\omega^l$; $b^l$ and $\nabla b^l$ indicated a bias matrix from $(l+1)^{th}$ hidden layer to $l^{th}$ hidden layer and a bias of the bias matrix $b^l$; the weights and the biases are updated successfully based on the back propagation from the output layer to the input layer, and the foregoing processes needed to be repeated until a final iteration criterion is met.

Method of the step 3's identifying parameters of the PV cell by using the IEO algorithm until the convergence condition of the IEO algorithm is reached, and finally outputting the optimal identified parameters comprises: step 3.1, an initialization step, performed according to following equation:

$$C_i^{initial} = C_{min} + r_i(C_{max} - C_{min}), i=1,2,\ldots,n$$

Where $C_i^{initial}$ represents an initial concentration of $i^{th}$ particle; $C_{max}$, $C_{min}$ represent maximum dimension value and minimum dimension value; $r_i$ represents a random vector between 0 and 1; n represents the number of particles, and setting the number of iterations k=0.

Step 3.2, solution vector of each PV cell is regarded as optimization variable of the IEO; PV cell parameters are distributed within a certain range and thus the optimization variables are limited within an upper limit and a lower limit, as presented by equation below:

$$x_h^{min} \leq x_h \leq x_h^{max}, h \in H$$

Where $x_h$ represents $h^{th}$ optimization variable which is $h^{th}$ PV cell parameter; $x_h^{max}$ and $x_h^{min}$ represent the upper limit and the lower limit of the $h^{th}$ optimization variable; H represents a set of the optimization variables.

Step 3.3, calculating fitness values of all particles according to the fitness function; step 3.4, constructing an equilibrium pool according to the fitness values of all particles; step 3.5, calculating selection probabilities of all candidate equilibrium particles; step 3.6, selecting a candidate equilibrium individual from the current equilibrium pool based on selection probabilities; step 3.7, calculating exponential terms of the particles; step 3.8, calculating generating rates of the particles; step 3.9, updating solutions of the particles, the solutions of the particles are updated by equation below:

$$\vec{C} = \vec{C}_{eq} + (\vec{C} - \vec{C}_{eq}) \cdot \vec{F} + \frac{\vec{G}}{\vec{\lambda} V}(1 - \vec{F});$$

Step 3.10, updating iteration count by k=k+1; and step 3.11, determining whether the IEO stops iteration and being convergent.

Method of the step 3.4's constructing the equilibrium pool according to the fitness values of all particles comprises: determining that final convergent state as an equilibrium state, consisting of four best particles so far and another individual particle, which are defined as the candidate equilibrium particles, from which one equilibrium pool is generated:

$$\vec{C}_{eq,pool} = \{\vec{C}_{eq(1)}, \vec{C}_{eq(2)}, \vec{C}_{eq(3)}, \vec{C}_{eq(4)}, \vec{C}_{eq(ave)}\}.$$

Method of the step 3.5's calculating the selection probabilities of all candidate equilibrium particles comprises: instead of randomly selecting equilibrium candidates from the equilibrium pool, the IEO assigns different selection probabilities to all equilibrium candidates, and the fitness values of all equilibrium candidates are normalized within a range of 0 to 1, such that the selection probabilities are determined by the following equation:

$$p_t = p_{min} + (p_{max} - p_{min}) \times \frac{\max_{i \in E_p} F_i - F_m}{\max_{i \in E_p} F_i - \min_{i \in E_p} F_i}, j \in E_p$$

Where $p_{max}$ and $p_{min}$ respectively represent the maximum selection probability and minimum selection probability; p represents $m^{th}$ selection probability of the equilibrium candidates; and $E_p$ represents a set of the equilibrium candidates.

Method of the step 3.7's calculating exponential terms of the particles comprises: during a concentration updating process, the exponential terms (F) can be presented by equation below:

$$\vec{F} = e^{-\vec{\lambda}(t-t_0)}$$

Where $\vec{\lambda}$ represents a random vector between 0 to 1, time t is an iteration function presented as following equation:

$$t = \left(1 - \frac{iter}{iter_{max}}\right)^{\left(a_2 \frac{iter}{iter_{max}}\right)}$$

Where iter and $iter_{max}$ respectively represent current iteration counts and maximum iteration counts; $a_2$ is a constant used in a local searching adjustment; for avoiding premature convergence, a following equation is added:

$$\vec{t}_0 = \frac{1}{\vec{\lambda}}\ln[-a_1\text{sign}(\vec{r} - 0.5)]\left(1 - e^{-\vec{\lambda}t}\right) + t$$

Where $a_1$ represents a constant value proportional to a global searching ability; $\text{sign}(\vec{r} - 0.5)$ determines a direction of the global searching and the local searching; $\vec{r}$ represents a random vector between 0 and 1.

Method of the step 3.8's calculating generating rates of the particles comprises: the generating rates (G) is calculated based on equations below:

$$\vec{G} = \vec{G}_0 e^{-\vec{\lambda}(t-t_0)} = \vec{G}_0 \vec{F}$$

$$\vec{G}_0 = \overrightarrow{GCP}(\vec{C}_{eq} - \vec{\lambda}C)$$

$$\overrightarrow{GCP} = \begin{cases} 0.5r_1, & r_2 \geq GP \\ 0, & r_2 \geq GP \end{cases}$$

Where $\vec{G}$ is an initial value; $r_1$ and $r_2$ are random values between 0 and 1 respectively; GCP is defined as a control parameter of generating rate; GP represents a generation probability, indicating a proportion of particles performing state updating by using generation.

Method of the step 3.11's determining whether the IEO stops the iteration and being convergent comprises: if $k \geq k_{max}$, finishing the iteration of the IEO, the algorithm is convergent, and an optimal solution is outputted, and the outputted optimal solution is a result of the identified parameters; else if $k < k_{max}$, back to the step 3.2.

The beneficial effect of the invention:

1. The IEO algorithm adopted in the invention predicts and expands the output I-V data samples through data prediction based on BP neural network, so as to establish a more reliable fitness function to effectively improve the quality of solution.
2. The invention uses the IEO algorithm to allocate different selection probabilities to different equilibrium candidates according to their fitness values, so as to realize a deeper search and improve the overall optimization efficiency.
3. The actual performance of the IEO is comprehensively verified by using the dual-diode PV cell model. The case study shows that compared with Grey Wolf optimization (GWO) algorithm, the IEO algorithm of the invention can effectively improve the optimization accuracy and efficiency. Solving technical problems of the existing technology such as, cannot reach the optimal parameter identification, and being easy to be trapped into the local optimal.

DETAILED DESCRIPTION

In order to solve the problem that parameters are difficult to be identified accurately in the process of PV cell modeling, so as to affect the accurate modeling, the invention provides a PV cell parameter identification method based on the IEO algorithm. With fast convergence speed and high search accuracy, this algorithm can realize efficient and accurate parameter identification in PV cell modeling and simulation, thus a reliable PV cell modeling can be realized.

The object of the invention is realized through the following technical scheme: First, establishing a PV cell model; secondly, predicting output data of PV cells by using Back Propagation (BP) neural network, and establishing more reliable fitness function. Then, identifying the PV cell parameters using the IEO algorithm until a convergence condition of IEO algorithm is reached, and finally outputting optimal parameters.

Figure 1:
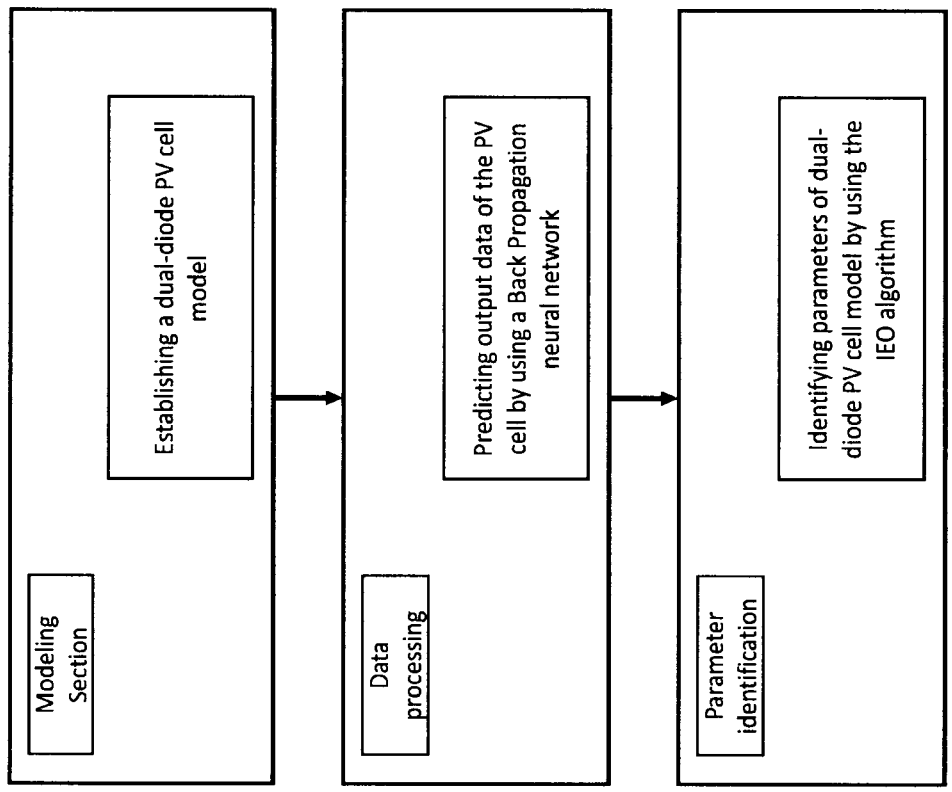
FIG. 1 depicts a structure diagram of PV cell parameter identification based on IEO algorithm.
Figure 2:
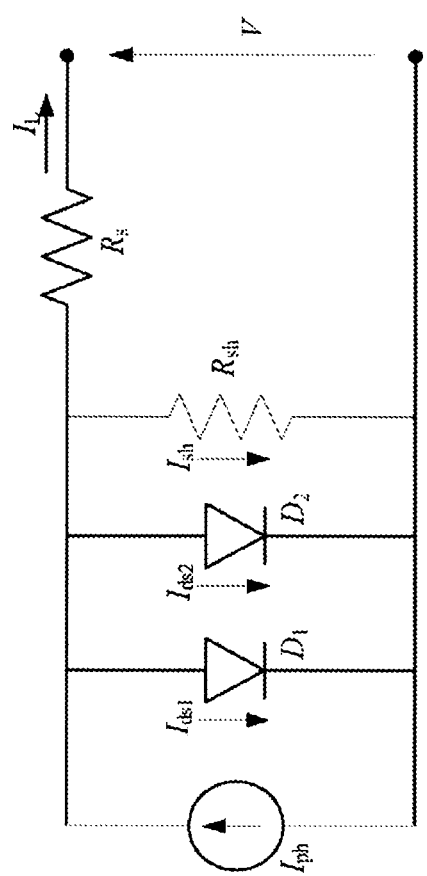
FIG. 2 depicts a diagram of the dual-diode PV cell model.

Specific steps are:

Establishing PV cell model (see FIG. 2) and the fitness function. The output current-voltage characteristic equation is presented as below:

$$I_L = I_{ph} - I_{sd1}\left[\exp\left(\frac{q(V_L + I_L R_s)}{a_1 V_T}\right) - 1\right] - I_{sd2}\left[\exp\left(\frac{q(V_L + I_L R_s)}{a_2 V_T}\right) - 1\right] - \frac{V_L + I_L R_s}{R_{sh}} \quad (1)$$

where $I_L$ and $V_L$ respectively indicate an output current and an output voltage of the PV cell; $I_{sh}$ indicates a current flowed through a parallel resistance $R_{sh}$; and the heat voltage $V_T$ is defined as:

$$V_T = \frac{KT}{q} \quad (2)$$

where T indicates a cell temperature; $K=1.38\times10^{-23}$ J/K indicates Boltzmann constant; $q=1.6\times10^{-19}$ C indicates electron charge; $I_{ph}$ is photogenerated current, $I_{sd1}$ and $I_{sd2}$ are reverse saturation current of the diode, $R_s$ is the series resistance, $R_{sh}$ is the parallel resistance, and diode ideal factors $a_1$ and $a_2$ are the parameters to be identified.

The main goal of parameter identification is to search for appropriate parameters to effectively reduce errors between the experimental data and the simulated data, which can be quantitatively evaluated by an objective function.

Here, a root mean square error (RMSE) is selected as the objective function, and, for achieving an optimal effect, the minimum objective function is required, such that an equation of the objective function is established as below:

$$RMSE(x) = \sqrt{\frac{1}{N}\sum_{k=1}^{N}(f(V_L, I_L, x))^2} \quad (3)$$

Where RMSE (x) is the objective function; $x=\{I_{ph}, I_{sd1}, I_{sd2}, R_s, R_{sh}, a_1, a_2\}$ indicates a solution vector including unknown parameters to be identified; RMSE indicates the root mean square error; N indicates the number of experiments; $f(V_L, I_L, x)$ is an error function which is represented as below:

$$f(V_L, I_L, x) = I_{ph} - I_{sd1}\left[\exp\left(\frac{q(V_L + I_L R_s)}{a_1 V_T}\right) - 1\right] - I_{sd2}\left[\exp\left(\frac{q(V_L + I_L R_s)}{a_2 V_T}\right) - 1\right] - \frac{V_L + I_L R_s}{R_{sh}} - I_L \quad (4)$$

Since all solutions can satisfy the constraint condition (3), the objective function is directly selected as the fitness function in IEO. Based on predicted output data of the BP neural network, the fitness function can be designed as an extension function of RMSE, represented as an equation below:

$$F(x) = \sqrt{\frac{1}{N + N_p} \Sigma_{k=1}^{N+N_p} (f(V_L, I_L, x))^2} \quad (5)$$

Where Np indicates the number of predicting data.

Figure 3:
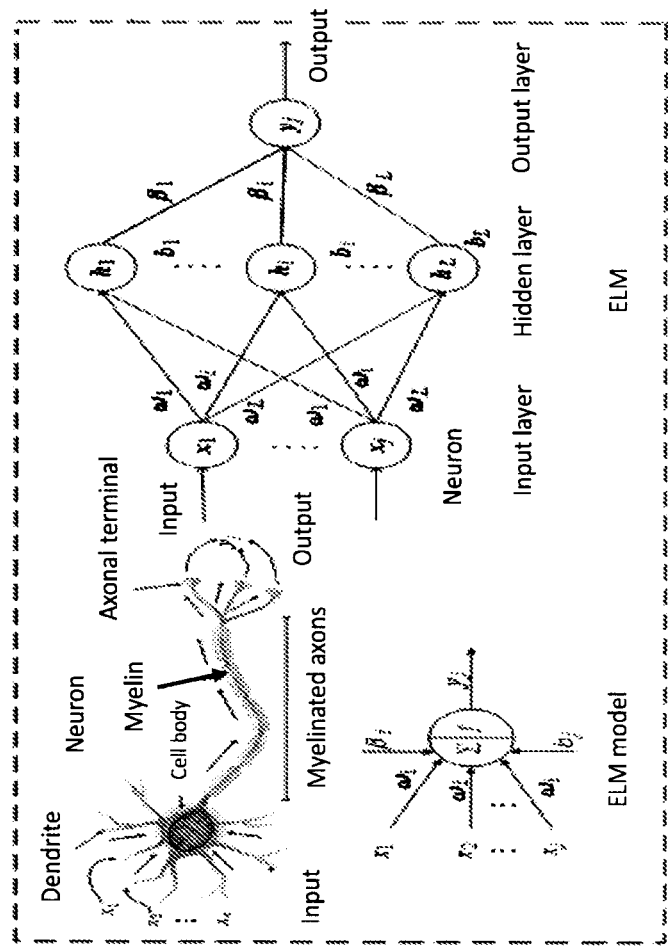
FIG. 3 depicts the structure diagram of a BP neural network

Steps of predicting an output data of the PV cell by the neural network based on the measured output I-V data includes:

A main structure of the BP neural network is the same as a main structure of ordinary neural network, consisting of three parts, illustrated by FIG. 3: input layer, hidden layer and output layer, and the structure diagram is shown by FIG. 3. Basic processes thereof including two processes, forward propagation and back propagation.

(1) the forward propagation, for $j^{th}$ neuron in $i^{th}$ layer, an input $z_j^l$ is described as:

$$z_j^l = (\Sigma_1^n \omega_{ij}^l \alpha_i^{l-1}) + b_j^l \quad (6)$$

Where n indicates the number of the neurons of $(l-1)^{th}$ layer; $\omega_{ij}^l$ indicates a weight of $i^{th}$ neuron of $(l-1)^{th}$ layer pointing to $j^{th}$ neuron of $(l-1)^{th}$ layer; $b_j^l$ indicates a bias of $j^{th}$ neuron of $l^{th}$ layer; $\alpha_i^{l-1}$ indicates value of $z_j^l$ calculated based on sigmoid function $$F(z) = \frac{1}{1 + e^{-z}},$$

represented as:

$$\alpha_i^l = F(z_j^l) \quad (7)$$

(2) In the back propagation, an error $L^m$ of a single sample is defined as:

$$L^m = L(\hat{y}^m - y^m) \quad (8)$$

Where L is loss function, $\hat{y}^m$ is output value of a positive sample propagation; $y^m$ is sample value; according to a chain rule, for a single sample m, a partial derivative of a weight $\nabla \omega_{jk}^{l+1}$ from the $j^{th}$ neuron of the hidden layer to $k^{th}$ neuron of the output layer is:

$$\nabla \omega_{jk}^{l+1} = L'(\hat{y}^m) \cdot F'(z_k^{l+1}) \cdot \alpha_i^l \quad (9)$$

And a partial derivative of a bias $b_j$ is calculated by the equation below:

$$\nabla b_j^{l+1} = L'(\hat{y}^m) \cdot F'(z_k^{l+1}) \quad (10)$$

By defining learning rate as μ, a weight matrix and a bias matrix are updated as below:

$$\omega^l = \omega^l - \mu \nabla \omega^l \quad (11)$$

$$b^l = b^l - \mu \nabla b^l \quad (12)$$

Where $\omega^l$ and $\nabla \omega^l$ respectively indicate a weight matrix from $(l-1)^{th}$ hidden layer to $l^{th}$ hidden layer and a bias of the weight matrix $\omega^l$; $b^l$ and $\nabla b^l$ indicate a bias matrix from $(l-1)^{th}$ hidden layer to $l^{th}$ hidden layer and a bias of the bias matrix $b^l$.

Thus, the weights and the biases are updated successfully based on the back propagation from the output layer to the input layer, and the foregoing processes needed to be repeated until a final iteration criterion is met.

Steps of identifying parameters of the PV cell by using the IEO algorithm including:

(1) Initialization.

An initialization step, performed according to following equation:

$$C_i^{initial} = C_{min} + r_i(C_{max} - C_{min}), \; i=1,2,\ldots,n \quad (13)$$

Where $C_i^{initial}$ represents an initial concentration of $i^{th}$ particle; $C_{max}$, $C_{min}$ represent maximum dimension value and minimum dimension value; $r_i$ represents a random vector between 0 and 1; n represents the number of particles, and setting the number of iterations k=0.

(2) Optimization variable.

Solution vector of each PV cell is regarded as optimization variable of the IEO. In fact, PV cell parameters are distributed within a certain range and thus the optimization variables are limited within an upper limit and a lower limit, as presented by equation below:

$$x_h^{min} \leq x_h \leq x_h^{max}, h \in H \quad (14)$$

Where $x_h$ represents $h^{th}$ optimization variable which is $h^{th}$ PV cell parameter; $x_h^{max}$ and $x_h^{min}$ represent the upper limit and the lower limit of the $h^{th}$ optimization variable; H represents a set of the optimization variables.

(3) Calculating fitness values of all particles according to the fitness function (equation (5)).

(4) Constructing an equilibrium pool according to the fitness values of all particles.

Determining that final convergent state as an equilibrium state, consisting of four best particles so far and another individual particle, which are defined as the candidate equilibrium particles, from which one equilibrium pool is generated:

$$\vec{C}_{eq,pool} = \{\vec{C}_{eq(1)}, \vec{C}_{eq(2)}, \vec{C}_{eq(3)}, \vec{C}_{eq(4)}, \vec{C}_{eq(ave)}\} \quad (15)$$

(5) Calculating selection probabilities of all candidate equilibrium particles.

Instead of randomly selecting equilibrium candidates from the equilibrium pool, the IEO assigns different selection probabilities to all equilibrium candidates. For example, an equilibrium candidate with smaller fitness value has higher selection probability (probability to be selected). It should be noted, the fitness values of all equilibrium candidates are normalized within a range of 0 to 1, such that the selection probabilities are determined by the following equation:

$$p_t = p_{min} + (p_{max} - p_{min}) \times \frac{\max_{i \in E_p} F_i - F_m}{\max_{i \in E_p} F_i - \min_{i \in E_p} F_i}, \; j \in E_p \quad (16)$$

Where $p_{max}$ and $p_{min}$ respectively represent the maximum selection probability and minimum selection probability; p represents $m^{th}$ selection probability of the equilibrium candidates; and $E_p$ represents a set of the equilibrium candidates.

(6) Selecting a candidate equilibrium individual from the current equilibrium pool based on selection probabilities.

(7) Calculating exponential terms of the particles.

During a concentration updating process, the exponential terms (F) can be presented by equation below:

$$\vec{F} = e^{-\vec{\lambda}(t-t_0)} \quad (17)$$

Where $\vec{\lambda}$ represents a random vector between 0 to 1, time t is an iteration function presented as following equation:

$$t = \left(1 - \frac{iter}{iter_{max}}\right)^{\left(a_2 \frac{iter}{iter_{max}}\right)} \quad (18)$$

Where iter and $iter_{max}$ respectively represent current iteration counts and maximum iteration counts; $a_2$ is a constant used in a local searching adjustment.

For avoiding premature convergence, a following equation is concerned:

$$\vec{t}_0 = \frac{1}{\vec{\lambda}} \ln[-a_1 \text{sign}(\vec{r} - 0.5)]\left(1 - e^{-\vec{\lambda}t}\right) + t \quad (19)$$

Where $a_1$ represents a constant value proportional to a global searching ability; $\text{sign}(\vec{r} - 0.5)$ determines a direction of the global searching and the local searching; $\vec{r}$ represents a random vector between 0 and 1.

(8) Calculating generating rates of the particles.

The generating rates (G) is calculated based on equations below:

$$\vec{G} = \vec{G}_0 e^{-\vec{\lambda}(t-t_0)} = \vec{G}_0 \vec{F} \quad (20)$$

$$\vec{G}_0 = \overrightarrow{GCP}(\vec{C}_{eq} - \vec{\lambda}\vec{C}) \quad (21)$$

$$\overrightarrow{GCP} = \begin{cases} 0.5r_1, & r_2 \geq GP \\ 0, & r_2 \geq GP \end{cases} \quad (22)$$

Where $\vec{G}$ is an initial value; $r_1$ and $r_2$ are random values between 0 and 1 respectively; GCP is defined as a control parameter of generating rate; GP represents a generation probability, indicating a proportion of particles performing state updating by using generation.

(9) Updating solutions of the particles, the solutions of the particles are updated by equation below.

The solutions of the particles are updated by equation below:

$$\vec{C} = \vec{C}_{eq} + (\vec{C} - \vec{C}_{eq}) \cdot \vec{F} + \frac{\vec{G}}{\vec{\lambda}V}(1 - \vec{F}) \quad (23)$$

(10) Updating iteration count by k=k+1.

(11) Determining whether the IEO stops iteration and being convergent.

If $k \geq k_{max}$, finishing the iteration of the IEO, the algorithm is convergent, and an optimal solution is outputted, and the outputted optimal solution is a result of the identified parameters; else, back to the step (2).

The present invention is further explained in combination with specific examples.

The IEO algorithm and the traditional GWO algorithm are respectively used to identify parameters under the dual diode PV cell model. A total of 26 sets of measured I-V data were extracted from a 57 mm R.T.C. France solar cell for simulation under weather conditions (light intensity G=1000 W/m² and temperature T=33° C.). In order to verify the optimization performance of the algorithm in the case of insufficient measured data, data acquisition gradients of 50%, 60%, 70%, 80%, 90% and 100% were randomly set from 26 pairs of measured data. Here, only IEO uses predictive data, while other systems use raw measurements.

Figure 4:
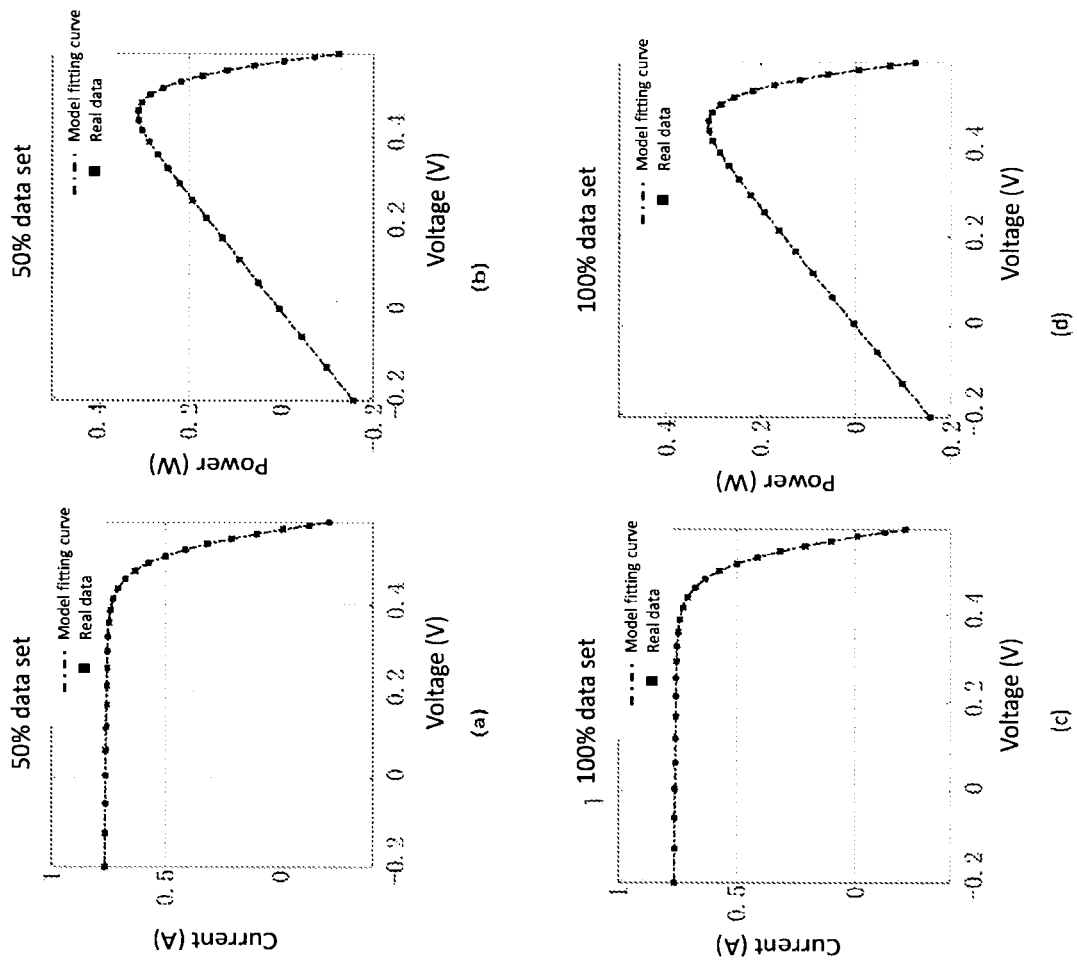
FIG. 4 depicts comparison diagrams of PV cell output power-voltage (POWER-VOLTAGE, P-V) and I-V fitting characteristic curves identified by IEO algorithm under 50% and 100% data.
Figure 5:
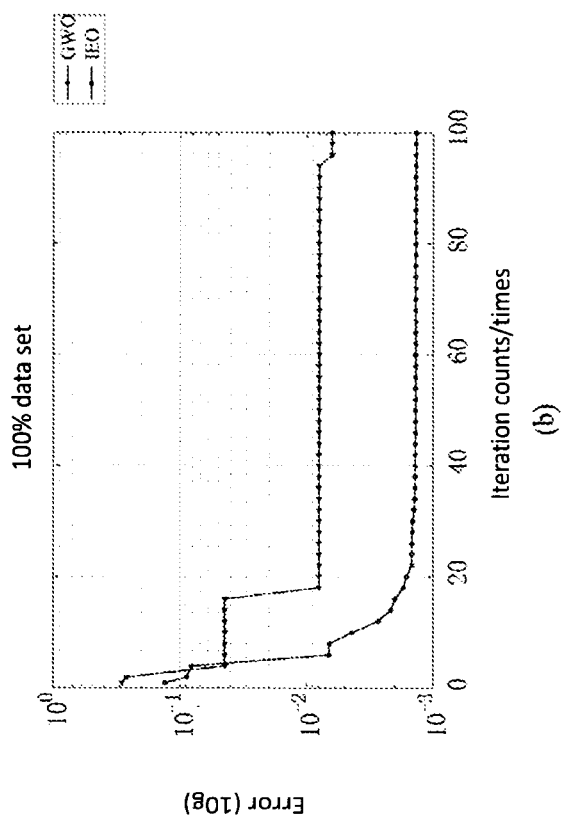
FIG. 5 depicts the comparison diagrams of convergence characteristics of parameter identifications by the IEO and GWO algorithms under 50% and 100% data.
Figure 5:
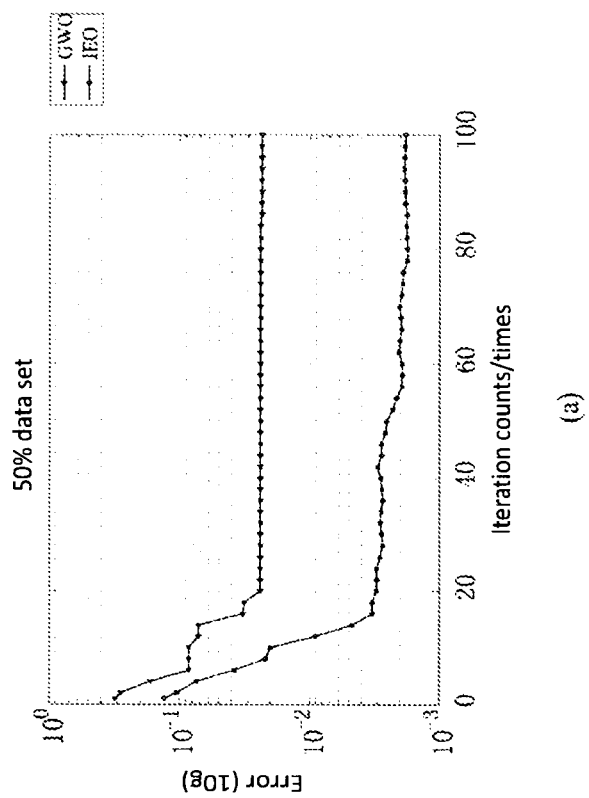
Figure 6:
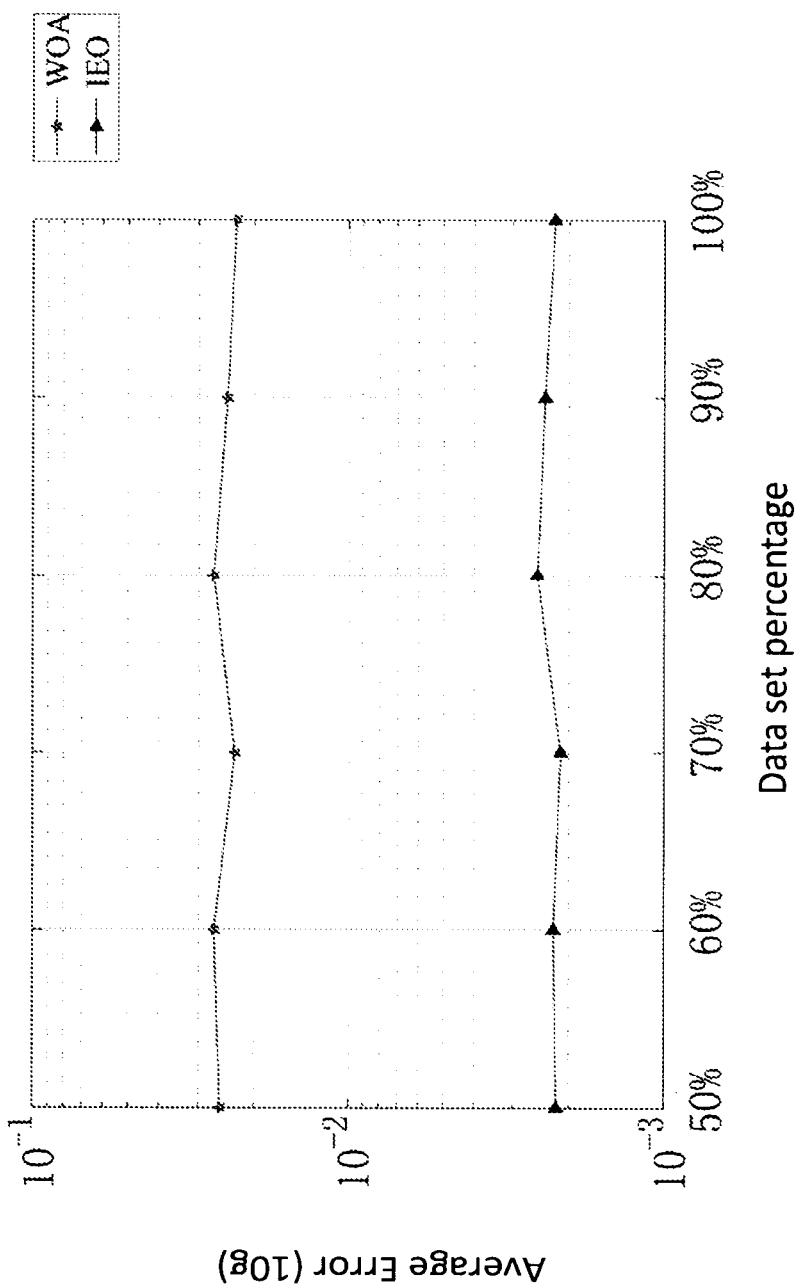
FIG. 6 depicts the comparison of average error of parameter identifications by the IEO and GWO algorithms in different data sets.

In order to make a fair comparison, the maximum number of iterations and population size of IEO and GWO algorithms are the same, with 100 iterations and 50 population size. Each algorithm was independently run 100 times in the PV cell model. The experimental results are shown below:

Embodiments: As shown by diagram (a) to (d) in FIG. 4, the model curves derived from IEO have a high degree of agreement with the actual data in both 50% and 100% data sets, demonstrating its outstanding performance for PV cell parameter identification in various data sets. As shown by diagram (a) to (b) in FIG. 5, both IEO algorithm and GWO algorithm can converge within 20 times under 50% and 100% data sets, but the parameter identification error based on IEO algorithm is significantly lower than that based on GWO algorithm. The convergence of IEO algorithm in two data sets also shows significant stability. As shown by FIG. 6, in each data set tested, the average error of parameter identification based on IEO algorithm is lower than that of GWO algorithm. In conclusion, the experimental results show that compared with GWO algorithm, IEO algorithm can use less measured data to identify the unknown parameters of the dual-diode cell model of PV cell faster and more accurately. Table 1 shows the unknown parameter values and errors of the PV cell dual-diode model identified by IEO algorithm. The results show that the convergence error of IEO algorithm is smaller than GWO algorithm, that is, the parameter identification results are more accurate.

TABLE 1

Results and errors of the parameter identification of PV cell dual-diode model.

| Algorithm | $I_{ph}$ (A) | $I_{sd1}$ (μA) | $R_s$ (Ω) | $R_{sh}$ (Ω) | $\alpha_1$ | $I_{sd2}$ (μA) | $\alpha_2$ | RMSE |
|---|---|---|---|---|---|---|---|---|
| GWO | 0.7608 | 2.54E−07 | 0.0369 | 41.4820 | 1.6279 | 1.43E−07 | 1.4250 | 1.52E−03 |
| IEO | 0.7606 | 6.58E−07 | 0.0367 | 56.3939 | 1.7119 | 8.77E−08 | 1.3890 | 1.03E−03 |

What is claimed is:

1. A photovoltaic (PV) cell parameter identification method based on an improved equilibrium optimizer (IEO) algorithm, comprising:
step 1, establishing a PV cell model and a fitness function;
step 2, based on a measured output I-V data, predicting output data of a PV cell by a Back Propagation (BP) neural network;
step 3, identifying parameters of the PV cell by using the IEO algorithm until convergence condition of the IEO algorithm is reached, and finally outputting optimal identified parameters.

2. The PV cell parameter identification method based on the improved equilibrium optimizer algorithm of claim 1, wherein a method of the step 1's establishing the PV cell model and the fitness function comprises:
adopting a dual diodes PV cell model and establishing an output current-voltage characteristic equation as below:

$$I_L = I_{ph} - I_{sd1}\left[\exp\left(\frac{q(V_L + I_L R_s)}{a_1 V_T}\right) - 1\right] - I_{sd2}\left[\exp\left(\frac{q(V_L + I_L R_s)}{a_2 V_T}\right) - 1\right] - \frac{V_L + I_L R_s}{R_{sh}}$$

where $I_L$ and $V_L$ respectively indicate an output current and an output voltage of the PV cell; $I_{ph}$ indicates a current flowed through a parallel resistance $R_{sh}$; and the heat voltage $V_T$ is defined as:

$$V_T = \frac{KT}{q}$$

where T indicates a cell temperature; $K=1.38\times10^{-23}$ J/K indicates Boltzmann constant; $q=1.6\times10^{-19}$ C indicates electron charge; $I_{ph}$ is photogenerated current, $I_{sd1}$ and $I_{sd2}$ are reverse saturation current of the diode, $R_s$ is the series resistance, $R_{sh}$ is the parallel resistance, and diode ideal factors $a_1$ and $a_2$ are the parameters to be identified;
selecting root mean square error (RMSE) as an objective function, and, for achieving an optimal effect, the minimum objective function is required, such that an equation of the objective function is established as below:

$$RMSE(x) = \sqrt{\frac{1}{N}\sum_{k=1}^{N}(f(V_L, I_L, x))^2}$$

where RMSE (x) is the objective function; $x=\{I_{ph}, I_{sd1}, I_{sd2}, R_s, R_{sh}, a_1, a_2\}$ indicates a solution vector including unknown parameters to be identified; RMSE indicates the root mean square error; N indicates a number of experiments; $f(V_L, I_L, x)$ is an error function which is represented as below:

$$f(V_L, I_L, x) = I_{ph} - I_{sd1}\left[\exp\left(\frac{q(V_L + I_L R_s)}{a_1 V_T}\right) - 1\right] - I_{sd2}\left[\exp\left(\frac{q(V_L + I_L R_s)}{a_2 V_T}\right) - 1\right] - \frac{V_L + I_L R_s}{R_{sh}} - I_L$$

where the fitness function is designed as an extension function of RMSE, represented as an equation below:

$$F(x) = \sqrt{\frac{1}{N + N_p}\sum_{k=1}^{N+N_p}(f(V_L, I_L, x))^2}$$

where $N_p$ indicates the number of predicting data.

3. The PV cell parameter identification method based on the improved equilibrium optimizer algorithm of claim 1, wherein a method of the step 2's, based on the measured output I-V data, predicting an output data of the PV cell by the neural network comprises:
a main structure of the BP neural network is the same as a main structure of ordinary neural network, consisting of three parts: input layer, hidden layer and output layer;
a basic process including forward propagation and back propagation;
weights and biases are updated successfully based on the back propagation from the output layer to the input layer; and
repeating the foregoing processes until a final iteration criterion is met.

4. The PV cell parameter identification method based on the improved equilibrium optimizer algorithm of claim 3, wherein a method of predicting the output data of the PV cell by the BP neural network further comprises:
in the forward propagation,
for $j^{th}$ neuron in $i^{th}$ layer, an input $z_j^l$ is described as:

$$z_j^l = \left(\sum_{1}^{n}\omega_{ij}^l \alpha_i^{l-1}\right) + b_j^l$$

where n indicates the number of the neurons of $(l-1)^{th}$ layer; $\omega_{ij}^l$ indicates a weight of $i^{th}$ neuron of $(l-1)^{th}$ layer pointing to $j^{th}$ neuron of $(l-1)^{th}$ layer; $b_j^l$ indicates a bias of $j^{th}$ neuron of $l^{th}$ layer; $\alpha_i^{l-1}$ indicates value of $z_j^l$ calculated based on sigmoid function $$F(z) = \frac{1}{1 + e^{-z}},$$

represented as:

$$\alpha_i^l = F(z_j^l);$$

in the back propagation,
an error $L^m$ of a single sample is defined as:

$$L^m = L(\hat{y}^m - y^m)$$

where L is loss function, $\hat{y}^m$ is output value of a positive sample propagation; $y^m$ is sample value;
according to a chain rule, for a single sample m, a partial derivative of a weight $\nabla\omega_{jk}^{l+1}$ from the $j^{th}$ neuron of the hidden layer to $k^{th}$ neuron of the output layer is:

$$\nabla\omega_{jk}^{l+1} = L'(\hat{y}^m) \cdot F'(z_k^{l+1}) \cdot \alpha_i^l$$

and a partial derivative of a bias $b_j^l$ is calculated by the equation below:

$$\nabla b_j^{l+1} = L'(y^m) \cdot F(z_k^{l+1})$$

By defining learning rate as μ, a weight matrix and a bias matrix are updated as below:

$$\omega^l = \omega^l - \mu \nabla \omega^l$$

$$b^l = b^l - \mu \nabla b^l$$

where $\omega^l$ and $\nabla \omega^l$ respectively indicate a weight matrix from $(l+1)^{th}$ hidden layer to $l^{th}$ hidden layer and a bias of the weight matrix $\omega^l$; $b^l$ and $\nabla b^l$ indicate a bias matrix from $(l-1)^{th}$ hidden layer to $l^{th}$ hidden layer and a bias of the bias matrix $b^l$;

the weights and the biases are updated successfully based on the back propagation from the output layer to the input layer, and the foregoing processes needed to be repeated until a final iteration criterion is met.

5. The PV cell parameter identification method based on the improved equilibrium optimizer algorithm of claim 1, wherein method of the step 3's identifying parameters of the PV cell by using the IEO algorithm until the convergence condition of the IEO algorithm is reached, and finally outputting the optimal identified parameters comprises:

step 3.1, an initialization step, performed according to following equation:

$$C_i^{initial} = C_{min} + r_i(C_{max} - C_{min}), \ i=1,2,\ldots,n$$

where $C_i^{initial}$ represents an initial concentration of $i^{th}$ particle; $C_{max}$, $C_{min}$ represent maximum dimension value and minimum dimension value; $r_i$ represents a random vector between 0 and 1; n represents the number of particles, and setting the number of iterations k=0;

step 3.2, solution vector of each PV cell is regarded as optimization variable of the IEO; PV cell parameters are distributed within a certain range and thus the optimization variables are limited within an upper limit and a lower limit, as presented by equation below:

$$x_h^{min} \leq x_h \leq x_h^{max}, h \in H$$

where $x_h$ represents $h^{th}$ optimization variable which is $h^{th}$ PV cell parameter; $x_h^{max}$ and $x_h^{min}$ represent the upper limit and the lower limit of the $h^{th}$ optimization variable; H represents a set of the optimization variables;

step 3.3, calculating fitness values of all particles according to the fitness function;

step 3.4, constructing an equilibrium pool according to the fitness values of all particles;

step 3.5, calculating selection probabilities of all candidate equilibrium particles;

step 3.6, selecting a candidate equilibrium individual from the current equilibrium pool based on selection probabilities;

step 3.7, calculating exponential terms of the particles;

step 3.8, calculating generating rates of the particles;

step 3.9, updating solutions of the particles, the solutions of the particles are updated by equation below:

$$\vec{C} = \vec{C}_{eq} + (\vec{C} - \vec{C}_{eq}) \cdot \vec{F} + \frac{\vec{G}}{\vec{\lambda}V}(1-\vec{F});$$

step 3.10, updating iteration count by k=k+1; and
step 3.11, determining whether the IEO stops iteration and being convergent.

6. The PV cell parameter identification method based on the improved equilibrium optimizer algorithm of claim 5, wherein method of the step 3.4's constructing the equilibrium pool according to the fitness values of all particles comprises:

determining that final convergent state as an equilibrium state, consisting of four best particles so far and another individual particle, which are defined as the candidate equilibrium particles, from which one equilibrium pool is generated:

$$\vec{C}_{eq,pool} = \{\vec{C}_{eq(1)}, \vec{C}_{eq(2)}, \vec{C}_{eq(3)}, \vec{C}_{eq(4)}, \vec{C}_{eq(ave)}\}.$$

7. The PV cell parameter identification method based on the improved equilibrium optimizer algorithm of claim 5, wherein method of the step 3.5's calculating the selection probabilities of all candidate equilibrium particles comprises:

instead of randomly selecting equilibrium candidates from the equilibrium pool, the IEO assigns different selection probabilities to all equilibrium candidates, and the fitness values of all equilibrium candidates are normalized within a range of 0 to 1, such that the selection probabilities are determined by the following equation:

$$p_t = p_{min} + (p_{max} - p_{min}) \times \frac{\max_{i \in E_p} F_i - F_m}{\max_{i \in E_p} F_i - \min_{i \in E_p} F_i}, \ j \in E_p$$

where $p_{max}$, and $p_{min}$ respectively represent the maximum selection probability and minimum selection probability; p represents $m^{th}$ selection probability of the equilibrium candidates; and $E_p$ represents a set of the equilibrium candidates.

8. The PV cell parameter identification method based on the improved equilibrium optimizer algorithm of claim 5, wherein method of the step 3.7's calculating exponential terms of the particles comprises:

during a concentration updating process, the exponential terms (F) can be presented by equation below:

$$\vec{F} = e^{-\vec{\lambda}(t-t_0)}$$

where $\vec{\lambda}$ represents a random vector between 0 to 1, time t is an iteration function presented as following equation:

$$t = \left(1 - \frac{iter}{iter_{max}}\right)^{\left(a_2 \frac{iter}{iter_{max}}\right)}$$

where iter and $iter_{max}$ respectively represent current iteration counts and maximum iteration counts; $a_2$ is a constant used in a local searching adjustment;

for avoiding premature convergence, a following equation is added:

$$\vec{t}_0 = \frac{1}{\vec{\lambda}} \ln[-a_1 \text{sign}(\vec{r} - 0.5)]\left(1 - e^{-\vec{\lambda}t}\right) + t$$

where $a_1$ represents a constant value proportional to a global searching ability; $\text{sign}(\vec{r} - 0.5)$ determines a direction of the global searching and the local searching; $\vec{r}$ represents a random vector between 0 and 1.

9. The PV cell parameter identification method based on the improved equilibrium optimizer algorithm of claim 5, wherein method of the step 3.8's calculating generating rates of the particles comprises:

the generating rates (G) is calculated based on equations below:

$$\vec{G} = \vec{G}_0 e^{-\vec{\lambda}(t-t_0)} = \vec{G}_0 \vec{F}$$

$$\vec{G}_0 = \overrightarrow{GCP}(\vec{C}_{eq} - \vec{\lambda}C)$$

$$\overrightarrow{GCP} = \begin{cases} 0.5r_1, & r_2 \geq GP \\ 0, & r_2 \geq GP \end{cases}$$

where $\vec{G}$ is an initial value; $r_1$ and $r_2$ are random values between 0 and 1 respectively; GCP is defined as a control parameter of generating rate;

GP represents a generation probability, indicating a proportion of particles performing state updating by using generation.

10. The PV cell parameter identification method based on the improved equilibrium optimizer algorithm of claim 5, wherein method of the step 3.11's determining whether the IEO stops the iteration and being convergent comprises:

if $k \geq k_{max}$, finishing the iteration of the IEO, the algorithm is convergent, and an optimal solution is outputted, and the outputted optimal solution is a result of the identified parameters; else if $k < k_{max}$, back to the step 3.2.

* * * * *